March 5, 1929.  E. T. HARNEY  1,704,602
AUTOMOBILE CLUTCH OPERATING MECHANISM
Filed June 16, 1927  2 Sheets-Sheet 1
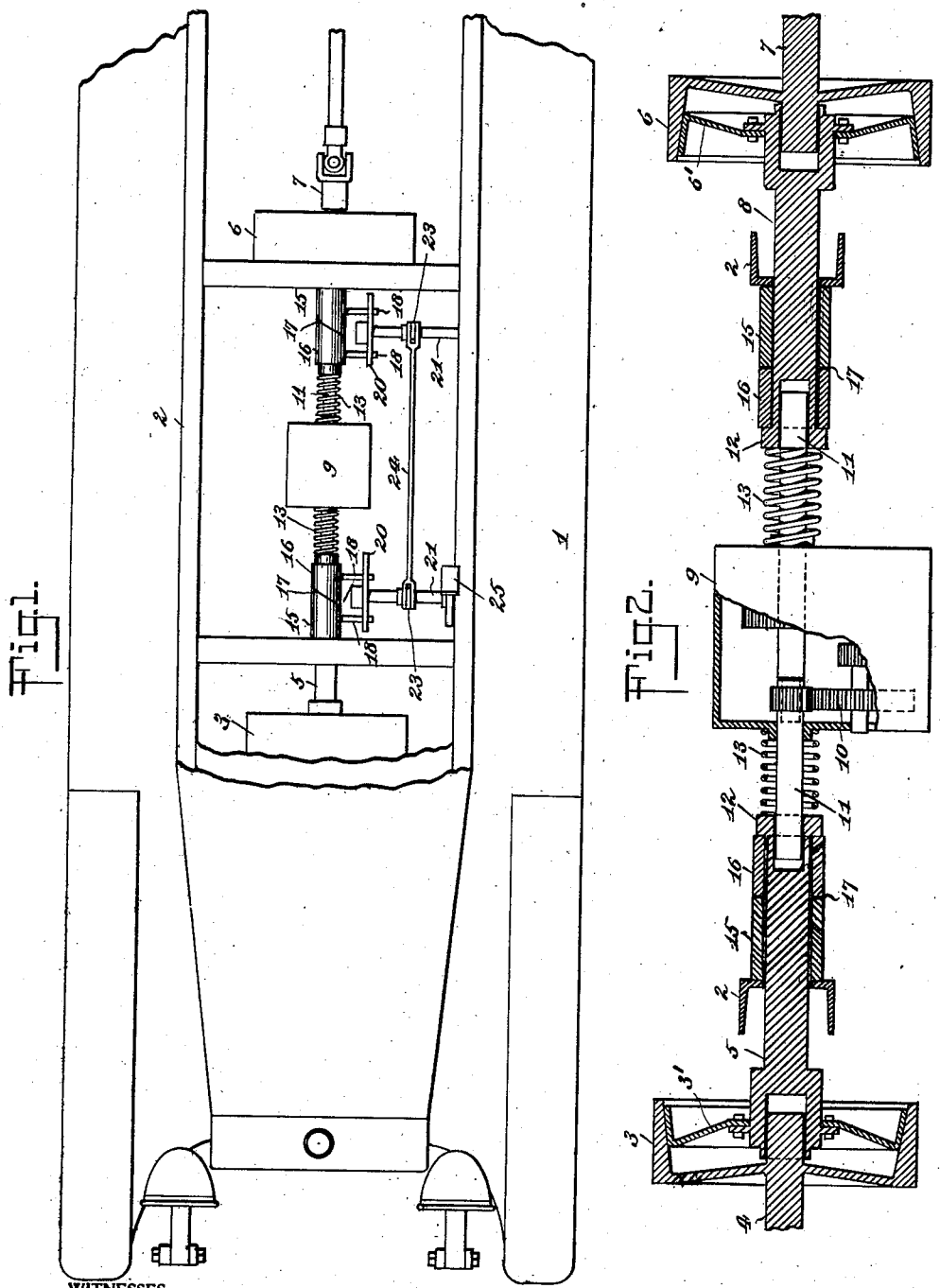
INVENTOR
Emmet T. Harney
BY
ATTORNEYS
WITNESSES March 5, 1929.  E. T. HARNEY  1,704,602
AUTOMOBILE CLUTCH OPERATING MECHANISM
Filed June 16, 1927  2 Sheets-Sheet 2
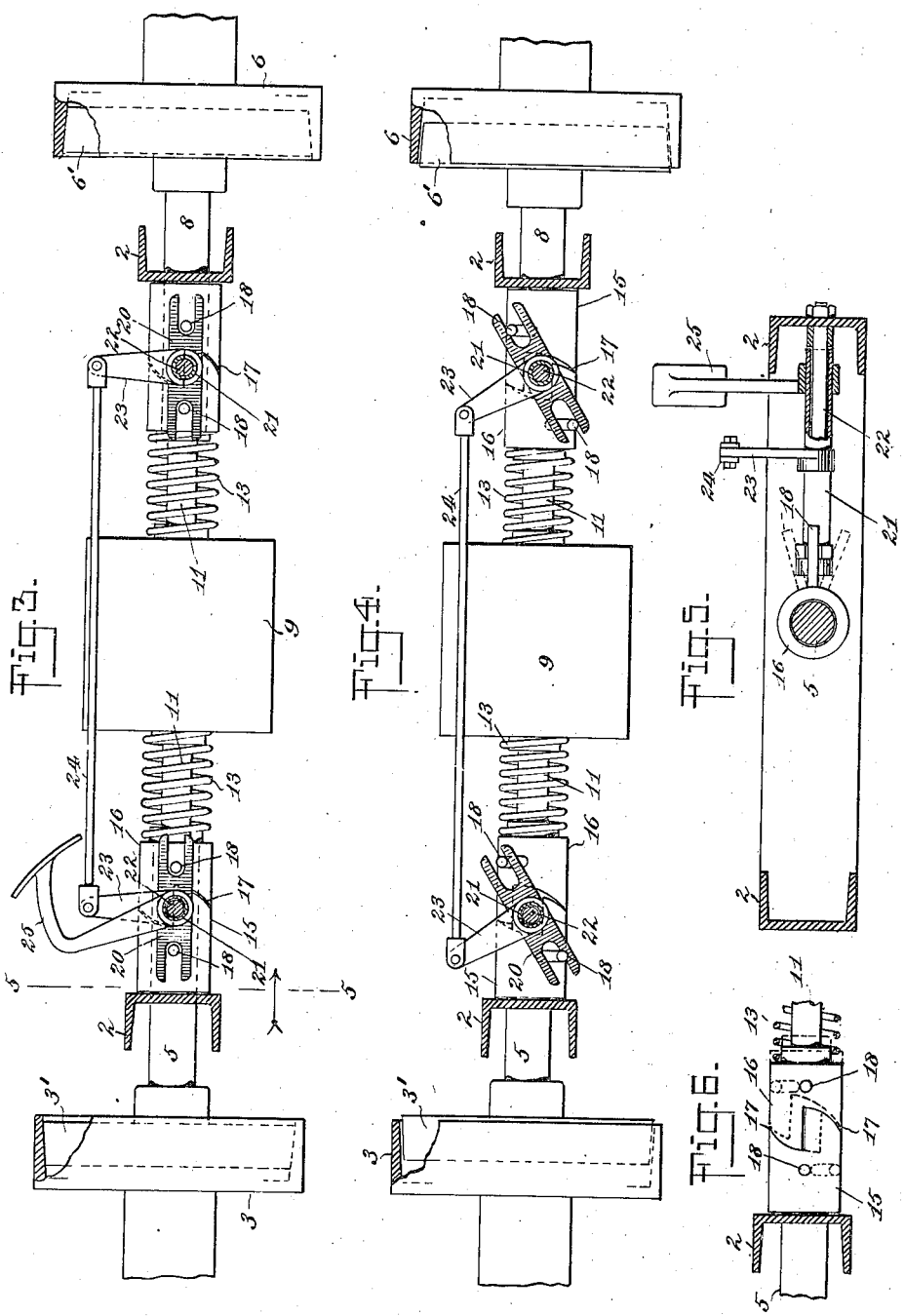

Patented Mar. 5, 1929.

1,704,602

UNITED STATES PATENT OFFICE.

EMMET T. HARNEY, OF GARWOOD, NEW JERSEY.

AUTOMOBILE CLUTCH-OPERATING MECHANISM.

Application filed June 16, 1927. Serial No. 199,349.

This invention relates to automobile clutch operating mechanisms, an object of the invention being to provide improved means whereby great power is accomplished through a minimum of energy applied to the transforming of a partial rotary movement into a longitudinal movement to operate the clutch.

A further object is to provide an improved clutch operating means at opposite sides of a transmission whereby the transmission is cut off from both the source of power and the rear axle, and the gears of the transmission are not turned during coasting or while idling the engine, such a means resulting in preventing stripping of the gears during the gear shift operation.

With these and other objects in view, the invention consists in certain novel features of construction and combinations and arrangements of parts which will be more fully hereinafter described and pointed out in the claim.

In the accompanying drawings—

Figure 1 is a broken plan view, more or less diagrammatic, illustrating my improved invention as applied to an automobile;

Figure 2 is a view mainly in longitudinal section through the shafting and clutches, the view being on a somewhat enlarged scale;

Figure 3 is a view, mainly in side elevation, of my improved mechanism, parts being in section and parts broken away for clearness;

Figure 4 is a view similar to Figure 3 showing the parts in different positions;

Figure 5 is a view in section on the line 5—5 of Figure 3;

Figure 6 is a view in elevation of one of the clutch operating devices.

1 represents an automobile, and 2 the chassis thereof. 3 represents a clutch member interposed between the drive shaft 4 of the engine and a shaft 5 alined therewith. 6 represents a clutch member on a shaft 7, which is adapted to operate the differential gears, and the rear axle of the automobile, such as commonly employed. This shaft 7 is in alinement with a shaft 8, and, in fact, all of said shafts 4, 5, 7 and 8 are in alinement with a transmission gear casing 9 interposed between the shafts 5 and 8 and enclosing any desired arrangement of gear transmission 10. Short shafts 11 operatively connected to the transmission gearing extend from the casing 9 and are coupled to the shafts 5 and 8, respectively, but this coupling is such as to permit a sliding longitudinal movement of the shafts 5 and 8, said shafts 5 and 8 having annular flanges 12 at their ends with springs 13 on the shafts 11 interposed between the gear transmission and the shafts 5 and 8, respectively, tending to force said shafts in opposite directions, or, in other words, in a direction to cause the clutch members to engage.

The clutch members 3 and 6 are engaged by movable clutch members 3' and 6', respectively, which are secured to the shafts 5 and 8, respectively, and I would have it understood that I do not limit myself to any particular form of clutch as any desired form may be employed. I employ separate operating mechanisms for each of these clutches located on the shafts 5 and 8, respectively, and as these clutch operating mechanisms are precisely alike the description of one will apply alike to both.

One the shafts 5 and 8 and bearing against the bars of the chassis 2 I locate sleeves 15, and between the sleeves 15 and the flanges 12 of the shafts I locate other sleeves 16. These sleeves 15 and 16 have cam engaging faces or a continuous engaging face, the reference numeral 17 being employed to indicate the cam faces of the ends of the sleeves 15 and 16.

Both pairs of sleeves 15 and 16 are provided with laterally projecting pins 18 which are positioned in the bifurcated ends of crossheads 20. These crossheads are secured on tubular shafts 21 and mounted to turn on fixed rods or supports 22 secured to the chassis 2, and each of said tubular shafts 21 has a crank arm 23 thereon.

The crank arms 23 are connected by a rod or link 24 so as to compel them to operate in unison. A clutch pedal 25 is secured to one of the tubular shafts 21 so as to permit the clutch to be operated by the foot of the driver, as is customary in the art.

The operation is as follows:

Figure 3 shows the parts in normal position. When the operator depresses the clutch pedal 25 it causes both of the crossheads 20 to swing to the position shown in Figure 4, this movement being controlled by the coupling of said parts through the medium of the crank arms 23 and the rod 24. As the crossheads swing they will cause the pins 18 to move away from each other, thus imparting a partial turning movement to the members 15 and 16, and due to the cam engaging faces 17 of said members or sleeves 15 and 16, the shafts 5 and 8 will be drawn inward to separate the clutch members and prevent any transmission of power to the gears 9 from the engine or from movement of the rear axle, so that whenever the clutches are thrown out there will be no appreciable movement of the gears so that the shifting of gears may be brought about without undue strain upon the teeth or "stripping", as it is commonly known in the art. When the pressure on the clutch pedal is released, the springs 13 will return the parts to normal position with the clutch members in engagement.

It will be noted that by reason of the movement of the crossheads 20, the operating members 15 and 16 are given a partial turning movement, which movement transmits a longitudinal movement to the shafts 5 and 8 carrying the movable clutch members. A very slight pressure on the clutch pedal will serve to release the clutches as an enormous leverage is had to overcome the pressure of the springs.

While I have illustrated what I believe to be a preferred embodiment of my invention, it is obvious that various changes and alterations might be made in the general form of the parts described without departing from my invention and hence I do not limit myself to the precise details set forth but consider myself at liberty to make such changes and alterations as fairly fall within the spirit and scope of the appended claim.

I claim:

A clutch operating mechanism, including a pair of sleeves having cam faces at their ends, a spring holding said sleeves in engagement with each other, a clutch adapted to be engaged by the longitudinal movement of one of said sleeves, and means for turning said sleeves in opposite directions to release the clutch, said means including pins on the sleeves, a crosshead operatively connected to the pins and a clutch pedal operatively connected to the crosshead.

EMMET T. HARNEY.